United States Patent
Ting et al.

(10) Patent No.: US 10,101,796 B2
(45) Date of Patent: Oct. 16, 2018

(54) PROCESSOR POWER ESTIMATION

(71) Applicant: TAIWAN SEMICONDUCTOR MANUFACTURING COMPANY, LTD., Hsinchu (TW)

(72) Inventors: Kai-Yuan Ting, San Jose, CA (US); Sandeep Kumar Goel, Dublin, CA (US); Tze-Chiang Huang, Saratoga, CA (US); Yun-Han Lee, Baoshan Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 54 days.

(21) Appl. No.: 15/167,243

(22) Filed: May 27, 2016

(65) Prior Publication Data
US 2017/0344091 A1  Nov. 30, 2017

(51) Int. Cl.
*G06F 9/00* (2006.01)
*G06F 1/32* (2006.01)

(52) U.S. Cl.
CPC .................... *G06F 1/3243* (2013.01)

(58) Field of Classification Search
CPC ........................................ G06F 1/3243
USPC ............. 713/340, 320, 1, 322; 1/1; 712/240; 714/45; 709/226
See application file for complete search history.

(56) References Cited

U.S. PATENT DOCUMENTS

| | | | | |
|---|---|---|---|---|
| 8,230,434 B2* | 7/2012 | Armstrong | ............ | G06F 9/5077 713/1 |
| 2003/0191976 A1* | 10/2003 | Cyran | ................. | G06F 11/3017 713/340 |
| 2007/0276645 A1* | 11/2007 | Veller | ................. | G06F 17/5022 703/18 |
| 2011/0283152 A1* | 11/2011 | Citron | ................. | G06F 11/3404 714/45 |
| 2013/0212546 A1* | 8/2013 | Chen | .................... | G06F 17/5045 716/109 |
| 2013/0254724 A1* | 9/2013 | Parikh | ..................... | G06F 17/50 716/53 |
| 2014/0053009 A1* | 2/2014 | Semin | ................. | G06F 9/30083 713/322 |
| 2014/0229720 A1* | 8/2014 | Hickey | .................... | G06F 1/324 712/240 |
| 2015/0241947 A1* | 8/2015 | Allen-Ware | .......... | G06F 1/3206 713/320 |

(Continued)

*Primary Examiner* — Aurel Prifti
(74) *Attorney, Agent, or Firm* — Hauptman Ham, LLP (57) ABSTRACT

A method of estimating power consumption of a processor includes accessing an electronic system level (ESL) model of the processor, the ESL model including a plurality of functional blocks, identifying a plurality of processor events by tracing activity of the plurality of functional blocks for a plurality of machine code instructions, and calculating a first power consumption value based on the plurality of processor events. The method also includes identifying a plurality of cycles by analyzing a plurality of micro-code operation codes corresponding to the plurality of machine code instructions, calculating a second power consumption value based on the plurality of cycles, and calculating a total power consumption value from the first power consumption value summed with the second power consumption value.

20 Claims, 9 Drawing Sheets

(56) References Cited

U.S. PATENT DOCUMENTS

| | | | |
|---|---|---|---|
| 2015/0309752 A1* | 10/2015 | Ellis | G06F 3/0625 |
| | | | 711/103 |
| 2015/0355943 A1* | 12/2015 | Harris | G06F 9/5083 |
| | | | 718/104 |
| 2015/0378412 A1* | 12/2015 | Suryanarayanan | G06F 1/3206 |
| | | | 713/340 |
| 2016/0119246 A1* | 4/2016 | Wang | H04L 47/72 |
| | | | 709/226 |
| 2016/0162004 A1* | 6/2016 | Ljubuncic | G06F 1/3228 |
| | | | 713/320 |
| 2016/0246349 A1* | 8/2016 | Perry | G06F 1/329 |
| 2017/0192473 A1* | 7/2017 | Lee | G06F 1/206 |
| 2018/0120920 A1* | 5/2018 | Iyigun | G06F 1/3203 |

* cited by examiner

Fig. 7 uCode Based (ARMv7 ESL CPU Model)

1. Interrupt Detect
   If interrupt occurs : e_int = e_int+1
2. Branch Predict
   If branch occurs : e_branch = e_branch+1
3. Fetch instruction
   pc=pc+4
   inst=MEM_R (pc)
4. Decode Instruction
   op1=inst [n:n-5]; op2 = inst [n-16:n-18]
   hash_key = op1 << 3|op 2
   cycles[inst] = cycles[inst] + array [hash_key * 31 % S]
5. Execute instruction
   if (op_type = MMU)
      e_mmu = e_mmu + 1
   else if (op_type = Cache_access)
      if (cache_hit)
         e_cache_hit = e_cache_hit + 1
      else if (cache_miss)
         e_cache_line_fill = e_cache_line_fill + 1
   else if (op_type = aux_processor)
      e_aux_processor = e_aux_processor + 1
6. If Sample_expired
   power_event = 10/0.02*0.0001 + 20/0.02*0.0003 + 8/0.02 * 0.0002 + 6/0.02 * 0.0003 + 9/0.02 * 0.0003 + 4/0.02 * 0.0004 = 0.735mW
   power_ucode = 30/0.02 * 0.0001 + 20/0.02 * 0.0001 + 15/0.02 * 0.0003 + 20/0.02 * 0.0002 + 18/0.02 * 0.0001 = 0.765mW
   total power of this 20ms = 0.735mW + 0.765mW = 1.5mW
7. Repeat step 1

Counts at Sampling Time
Sampling Period:20ms
e_int=10
e_branch=20
e_mmu=8
e_cache_hit=6
e_cache_line_fill=9
e_aux_processor=4 c_CLZ=30
c_LDR_mmd=20
c_LDR_rel=15
c_LDRD=20
c_SWP=18

PROCESSOR POWER ESTIMATION

BACKGROUND

Various aspects of both hardware and software development rely on estimation of power consumption by processors that execute machine code instructions. Power consumption estimations are important components of chip verification and validation, circuit design and software optimization, and process development.

For complex processor designs, processor behavior is sometimes modeled using electronic system level (ESL) models in which low-level hardware functions are represented by higher-level, more abstract functional blocks. The use of ESL models enables design optimization activities to be conducted at a relatively early stage in the design process.

Power estimations using ESL models are often based on executed instructions and calculated from state-level transitions. Transitions can be between active or idle states of processors and hit or miss states of cache memories. Other methods rely on more detailed analyses of processor activity. Generally, a tradeoff exists between faster, state-level estimation methods that may lack accuracy and more accurate, detail-based methods that are slower than state-level methods.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

In various embodiments, a method of estimating power consumption of a processor includes accessing an electronic system level (ESL) model of the processor, the ESL model comprising a plurality of functional blocks. For a given set of machine code instructions, a plurality of processor events is identified by tracing activity of the plurality of functional blocks and calculating an event-based power consumption value based on the plurality of processor events. The given set of machine code instructions is also analyzed to extract an ordered list of micro-code instructions corresponding to the ESL model. This ordered list of micro-code instructions is further analyzed to determine a number of cycles of each micro-code instruction identified from the set of machine code instructions. A cycle-based power consumption value is calculated from the number of cycles for each micro-code instruction and combined with the event-based power consumption value to estimate a total power consumption value.

Figure 1:
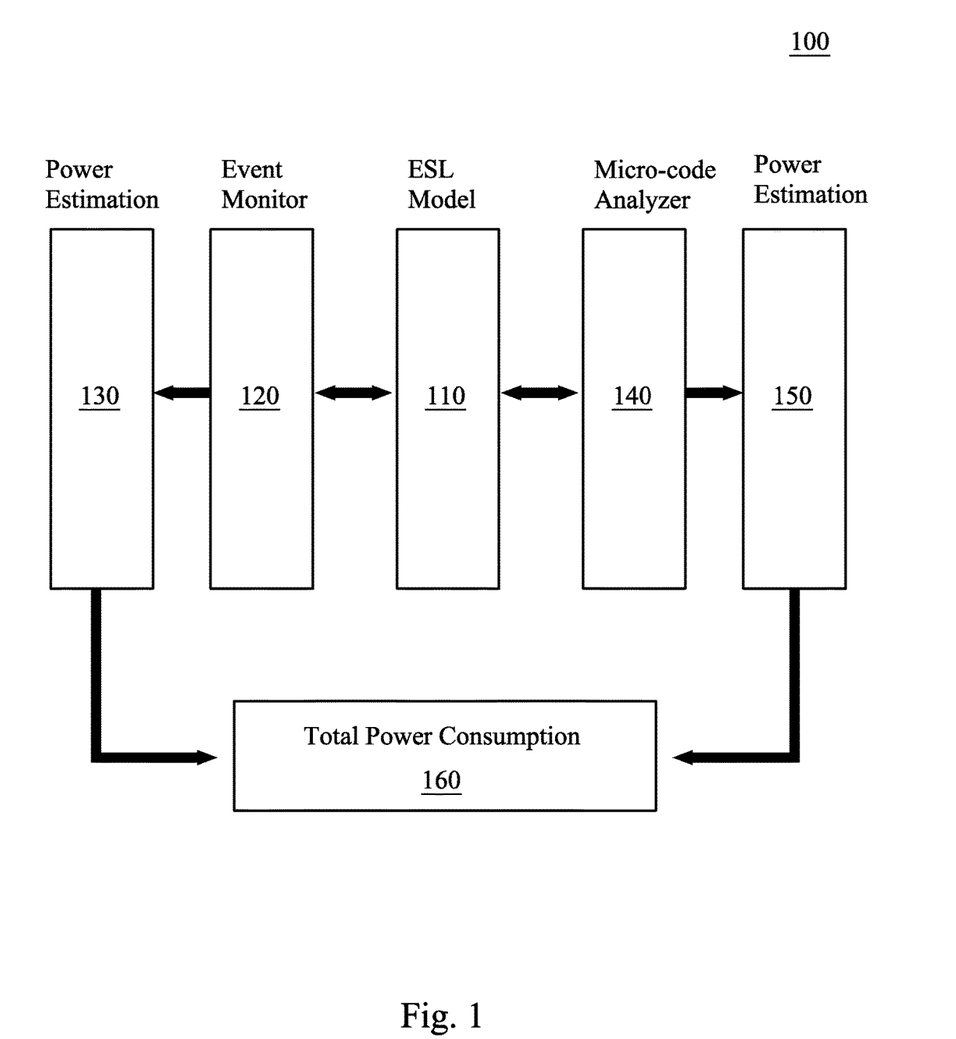
FIG. 1 is a block diagram of a flow chart of a method of estimating power consumption of a processor, in accordance with some embodiments.

FIG. 1 is a block diagram of a flow chart of a method 100 of estimating power consumption of a processor, in accordance with some embodiments. Method 100 is a set of instructions for execution by a processor and stored in a non-transitory, computer readable storage medium. An ESL processor model 110 is accessed by an event monitor 120 to calculate a power estimation 130, and by a micro-code analyzer 140 to calculate another power estimation 150. Power estimation 130 and power estimation 150 are combined to estimate a total power consumption 160. In some embodiments, power estimation 130 is a component of event monitor 120. In some embodiments, power estimation 150 is a component of micro-code analyzer 140.

ESL processor model 110 is a model of the processor for which the power consumption is to be estimated. In various embodiments, the processor is a central processing unit (CPU), a reduced instruction set computing (RISC) processor, an advanced RISC machine (ARM) processor, a digital signal processor (DSP), a processor core, or another similar processing device. In some embodiments, ESL processor model 110 is a model of a processor in a non-final stage of development. In some embodiments, ESL processor model 110 is a model of a processor having a completed design.

ESL processor model 110 represents the processor using functional blocks that perform block-level activities in response to machine code instructions. Event monitor 120 traces the activities of individual blocks in ESL processor model 110 to identify specific events associated with a particular set of machine code instructions. Non-limiting examples of such events include interrupts, branch predictions, fetch and memory management unit operations, and memory cache activity. In some embodiments, event monitor 120 traces the activities of a subset of the individual blocks in ESL processor model 110.

Power estimation 130 uses the events identified by event monitor 120 to calculate a first power consumption value. In some embodiments, power estimation 130 is a summation of the events identified by event monitor 120. In some embodiments, power estimation 130 is a summation of the events identified by event monitor 120 divided by a sampling period associated with the set of machine code instructions. In some embodiments, power estimation 130 is a summation of the events identified by event monitor 120 in which each event is multiplied by a weight, or weighting factor, that converts the event into an event-based power consumption value.

In some embodiments, a weight applied in power estimation 130 has the same value for each event. In some embodiments, a weight applied in power estimation 130 has a value that varies based on an event type for each event.

Micro-code analyzer 140 analyzes the set of machine code instructions to extract an ordered list of micro-code instructions corresponding to ESL processor model 110. An ordered list of micro-code instructions is sometimes referred to as a flow of micro-code instructions. Machine code instructions include either operation codes alone or both operation codes and operands. The micro-code instructions are derived by decoding the operation code portion or entirety of each machine code instruction in accordance with one or more functional blocks of ESL processor model 110. Micro-code analyzer 140 further analyzes this ordered list of micro-code instructions to determine a number of times each identified micro-code instruction is executed. Micro-code analyzer 140 thereby hashes out a number of cycles of each type of micro-code instruction from the ordered list of micro-code instructions associated with the machine code operations. Non-limiting examples of instruction types are arithmetic instructions, data processing instructions, and coprocessor instructions.

Power estimation 150 uses the cycles identified by micro-code analyzer 140 to calculate a second power consumption value. In some embodiments, power estimation 150 is a summation of the cycles identified by micro-code analyzer 140. In some embodiments, power estimation 150 is a summation of the cycles identified by micro-code analyzer 140 divided by a sampling period associated with the set of machine code instructions. In some embodiments, power estimation 150 is a summation of the cycles identified by micro-code analyzer 140 in which each cycle is multiplied by a weight that converts the cycle into a cycle-based power consumption value.

In some embodiments, a weight applied in power estimation 150 has the same value for each cycle. In some embodiments, a weight applied in power estimation 150 has a value that varies based on a micro-code type for each cycle.

Total power consumption 160 calculates a total power consumption value based on a combination of the first power consumption value from power estimation 130 and the second power consumption value from power estimation 140. In some embodiments, total power consumption 160 is a summation of the first power consumption value and the second power consumption value to obtain the total power consumption value. In some embodiments, total power consumption 160 is a summation of the first power consumption value and the second power consumption value divided by a sampling period associated with the set of machine code instructions to obtain the total power consumption value.

In some embodiments, a sampling period associated with a set of machine code instructions ranges from 5 milliseconds (ms) to 25 ms. In some embodiments, a sampling period associated with a set of machine code instructions ranges from 10 ms to 20 ms.

By combining events and numbers of micro-code cycles to estimate a processor power consumption value, accuracy is improved over methods in which state-level considerations are applied, and without requiring calculation times associated with other methods based on processor cycle analysis.

Figure 2:
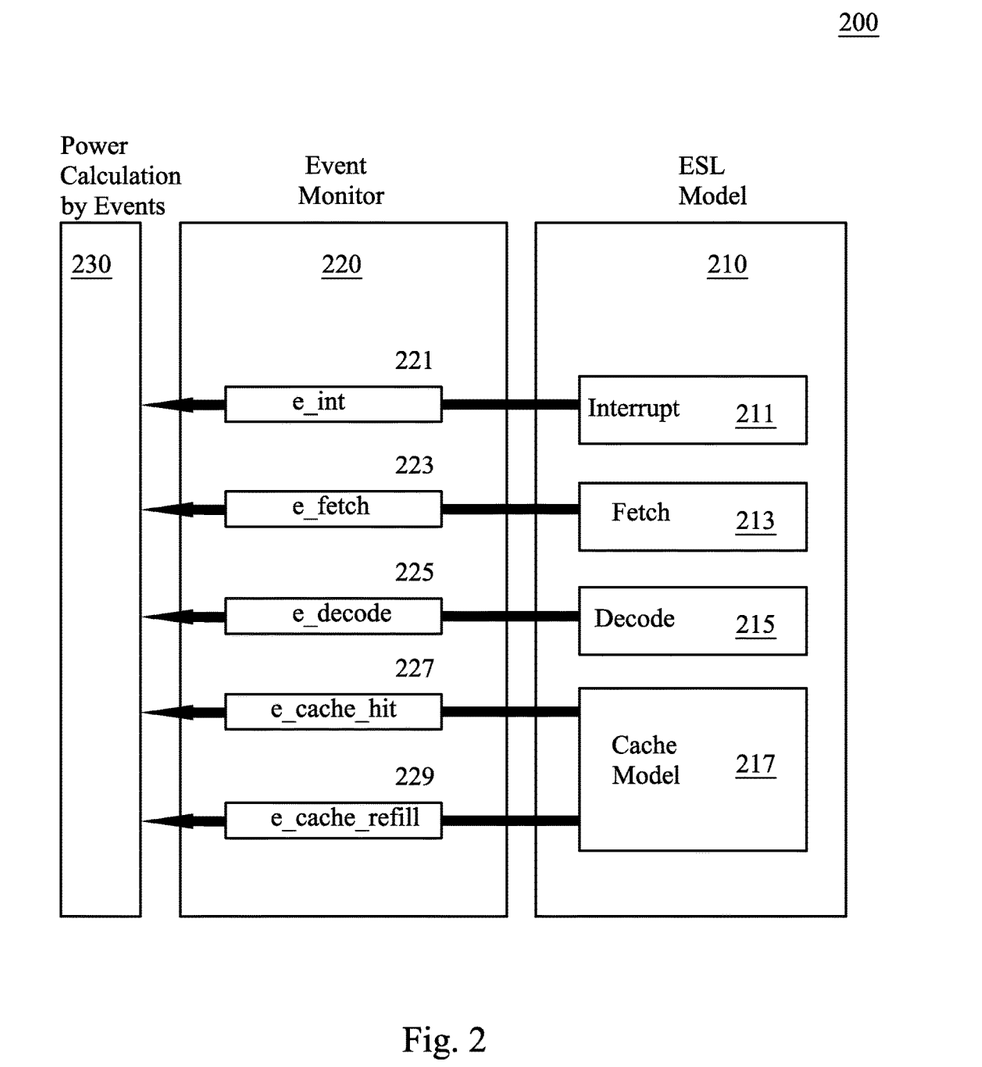
FIG. 2 is a block diagram of a flow chart of a method of estimating power consumption of a processor, in accordance with some embodiments.

FIG. 2 is a block diagram of a flow chart of a method 200 of estimating power consumption of a processor, in accordance with some embodiments. Method 200 is a set of instructions for execution by a processor and stored in a non-transitory, computer readable storage medium. An ESL model 210 is accessed by an event monitor 220 for a power calculation by events 230. In some embodiments, power calculation by events 230 is a component of event monitor 220. ESL model 210, event monitor 220, and power calculation by events 230 are usable as ESL processor model 110, event monitor 120, and power estimation 130, respectively, as discussed above with respect to FIG. 1.

ESL model 210 comprises blocks interrupt 211, fetch 213, decode 215, and cache model 217. Each of blocks interrupt 211, fetch 213, decode 215, and cache model 217 represents a functional component of ESL model 210. In some embodiments, ESL model 210 comprises additional blocks (not shown).

Each of blocks interrupt 211, fetch 213, decode 215, and cache model 217 of ESL model 210 is associated with at least one event monitored by event monitor 220. Block interrupt 211 is associated with event e_int 221, block fetch 213 is associated with event e_fetch 223, block decode 215 is associated with event e_decode 225, and block cache model 217 is associated with both event e_cache_hit 227 and event e_cache_refill 229. Each of events e_int 221, e_fetch 223, event e_decode 225, e_cache_hit 227, and event e_cache_refill 229 represents the execution of a physical event in the processor represented by ESL model 210.

Event monitor 220 identifies each of events e_int 221, e_fetch 223, event e_decode 225, e_cache_hit 227, and event e_cache_refill 229 associated with a set of machine code instructions executed on blocks interrupt 211, fetch 213, decode 215, and cache model 217 of ESL model 210.

Power calculation by events 230 receives a number of each of events e_int 221, e_fetch 223, event e_decode 225, e_cache_hit 227, and event e_cache_refill 229 identified by event monitor 220 and calculates a total event-based power consumption value. To convert each number of events to a power consumption value, power calculation by events 230 multiplies each number by a weight. In some embodiments, to convert each number of events to a power consumption value, power calculation by events 230 multiplies each number by a weight having a value based on the processor hardware activity associated with the particular event. In some embodiments, the value of each weight is a predetermined value provided by a hardware manufacturer. In some embodiments, the value of each weight is a predetermined value determined by a simulation program.

Power calculation by events 230 calculates the total event-based power consumption value by summing the power consumption values for each event. In some embodiments, power calculation by events 230 calculates a total event power consumption value by summing the power consumption values for each event and dividing by a sampling period associated with a set of machine code instructions.

An example calculation of a total event power consumption value is given by the equation $$Power = \sum_{e=0}^{Event=n} \frac{Ce}{SamplingPeriod} \times WE \quad (1)$$

where e is the number of event types, Ce is the individual event count for each type of event, WE is the weight for each type of event, and SamplingPeriod is the sampling period associated with the set of machine code instructions.

Figure 3:
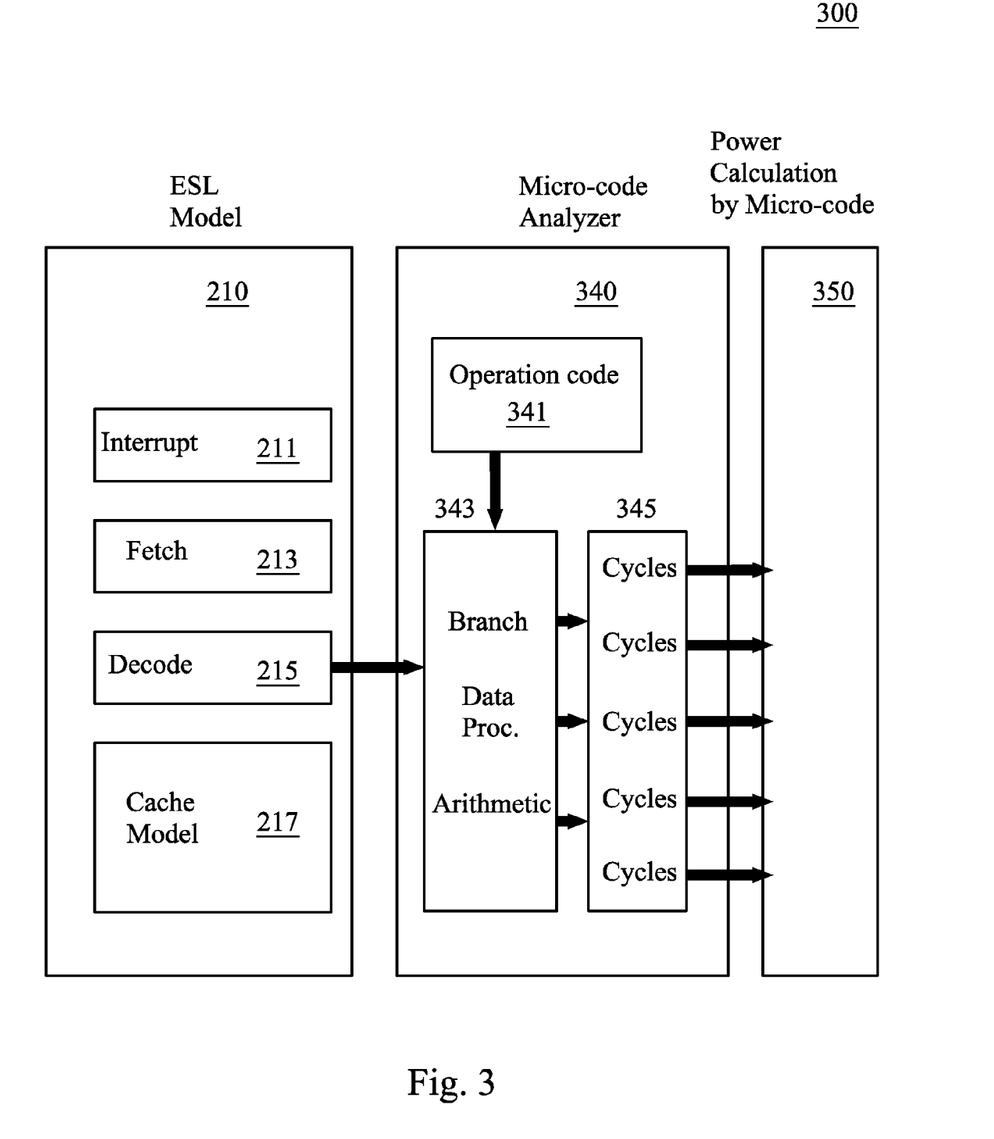
FIG. 3 is a block diagram of a flow chart of a method of estimating power consumption of a processor, in accordance with some embodiments.

FIG. 3 is a block diagram of a flow chart of a method 300 of estimating power consumption of a processor, in accordance with some embodiments. Method 300 is a set of instructions for execution by a processor and stored in a non-transitory, computer readable storage medium. ESL model 210 is accessed by a micro-code analyzer 340 for a power calculation by micro-code 350. In some embodiments, power calculation by micro-code 350 is a component of micro-code analyzer 340. ESL model 210, micro-code analyzer 340, and power calculation by micro-code 350 are usable as ESL processor model 110, micro-code analyzer 140, and power estimation 150, respectively, as discussed above with respect to FIG. 1.

Micro-code analyzer 340 accesses a set of machine code instructions. In some embodiments, the set of machine code instructions is accessed from a file stored in a non-transitory, computer readable storage medium. In some embodiments, the set of machine code instructions is received through an input/output (I/O) device.

Micro-code analyzer 340 extracts operation code 341 from the set of machine code instructions and uses functional block decode 215 of ESL model 210 to interpret operation code 341. For a given operation code instruction, functional block decode 215 provides the specific micro-code instruction(s) needed for execution on the processor represented by ESL model 210. Micro-code analyzer 340 applies functional block decode 215 to each operation code instruction in operation code 341 to determine micro-code instruction types 343. Micro-code instruction types 343 include branch, data processing, and arithmetic instructions. In some embodiments, micro-code instruction types include additional instruction types (not shown).

From operation code 341 and micro-code instruction types 343, micro-code analyzer 340 identifies a number of cycles of each micro-code instruction 345 associated with operation code 341.

Power calculation by micro-code 350 receives a number of cycles of each micro-code instruction 345 identified by micro-code analyzer 340 and calculates a total cycle-based power consumption value. To convert each number of cycles of each micro-code instruction 345 to a power consumption value, power calculation by micro-code 350 multiplies each number by a weight. In some embodiments, to convert each number of cycles of a micro-code instruction 345 to a power consumption value, power calculation by micro-code 350 multiplies each number by a weight having a value based on the physical activity associated with the particular micro-code instruction. In some embodiments, the value of each weight is a predetermined value provided by a hardware manufacturer. In some embodiments, the value of each weight is a predetermined value determined by a simulation program.

Power calculation by micro-code 350 calculates the total cycle-based power consumption value by summing the power consumption values for each micro-code instruction. In some embodiments, power calculation by micro-code 350 calculates a total cycle power consumption value by summing the power consumption values for each micro-code instruction and dividing by a sampling period associated with operation code 341.

An example calculation of a total cycle power consumption value is given by the equation $$Power = \sum_{i=0}^{Instruction=n} \frac{Ci}{SamplingPeriod} \times WI \qquad (2)$$

where i is the number of micro-code instruction types, Ci is the individual cycle count for each type of micro-code instruction, WI is the weight for each type of micro-code instruction, and SamplingPeriod is the sampling period associated with operation code 341.

Figure 6:
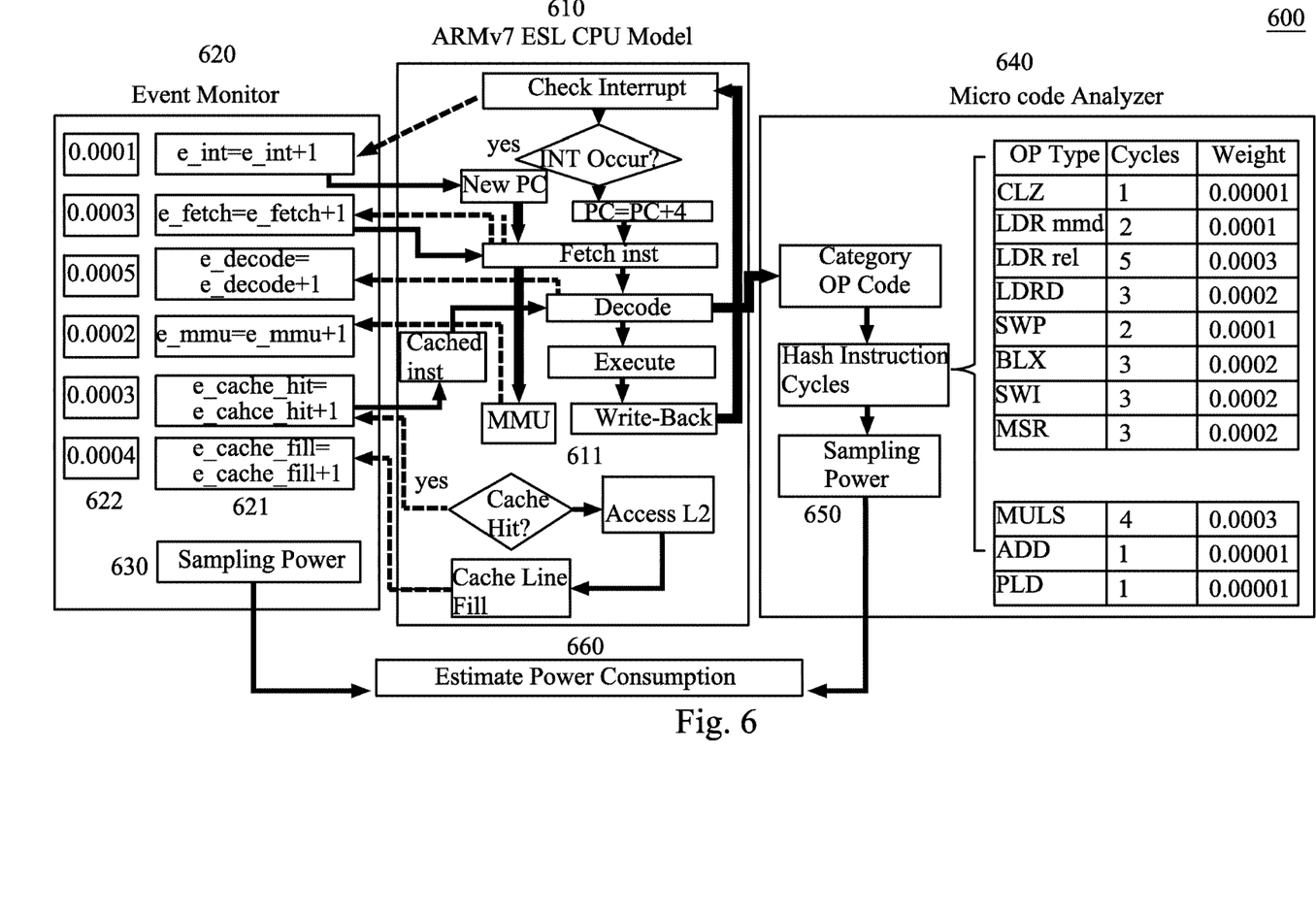
FIG. 6 is a block diagram of a flow chart of a method of estimating power consumption of a processor, in accordance with some embodiments.

FIG. 6 is a block diagram of a flow chart of a method 600 of estimating power consumption of a processor, in accordance with some embodiments. Method 600 is a set of instructions for execution by a processor and stored in a non-transitory, computer readable storage medium. An ARMv7 ESL CPU model 610 is accessed by an event monitor 620 and by a micro-code analyzer 640 to estimate power consumption 660.

ARMyv7 ESL CPU model 610, event monitor 620, micro-code analyzer 640, and estimate power consumption 660 are usable as ESL processor models 110 and 210, event monitors 120 and 220, micro-code analyzers 140 and 340, and total power consumption 160, respectively, as discussed above with respect to FIGS. 1-3.

ARMyv7 ESL CPU model 610 comprises blocks 611 that perform block-level activities in response to machine code instructions. Event monitor 620 traces the activities of individual blocks 611 in ARMv7 ESL CPU model 610 to identify specific events 621 associated with a particular set of machine code instructions. Each event 621 has an associated weight 622. Sampling power 630 performs a power calculation by events based on events 621 and weights 622 to generate a total event power consumption value.

Micro-code analyzer 640 analyzes the set of machine code instructions to extract an ordered list of micro-code instructions corresponding to ARMv7 ESL CPU model 610. Category OP Code derives the micro-code instructions by decoding the operation code portion or entirety of each machine code instruction in accordance with one or more functional blocks 611 of ARMv7 ESL CPU model 610. Hash Instruction Cycles analyzes the ordered list of micro-code instructions to determine a number of times each identified micro-code instruction OP Type is executed, and associates each identified micro-code instruction OP Type with a Weight. Micro-code analyzer 640 thereby hashes out a number of Cycles and Weight for each OP Type from the ordered list of micro-code instructions associated with the machine code operations. Sampling power 650 performs a power calculation by micro-code based on the Cycles and Weights for each OP Type to generate a total cycle power consumption value.

Estimate power consumption 660 combines the total event power consumption value from sampling power 630 and the total cycle power consumption value from sampling power 650 to estimate a total consumption power value for the set of machine code instructions executed on ARMv7 ESL CPU model 610.

Figure 7:
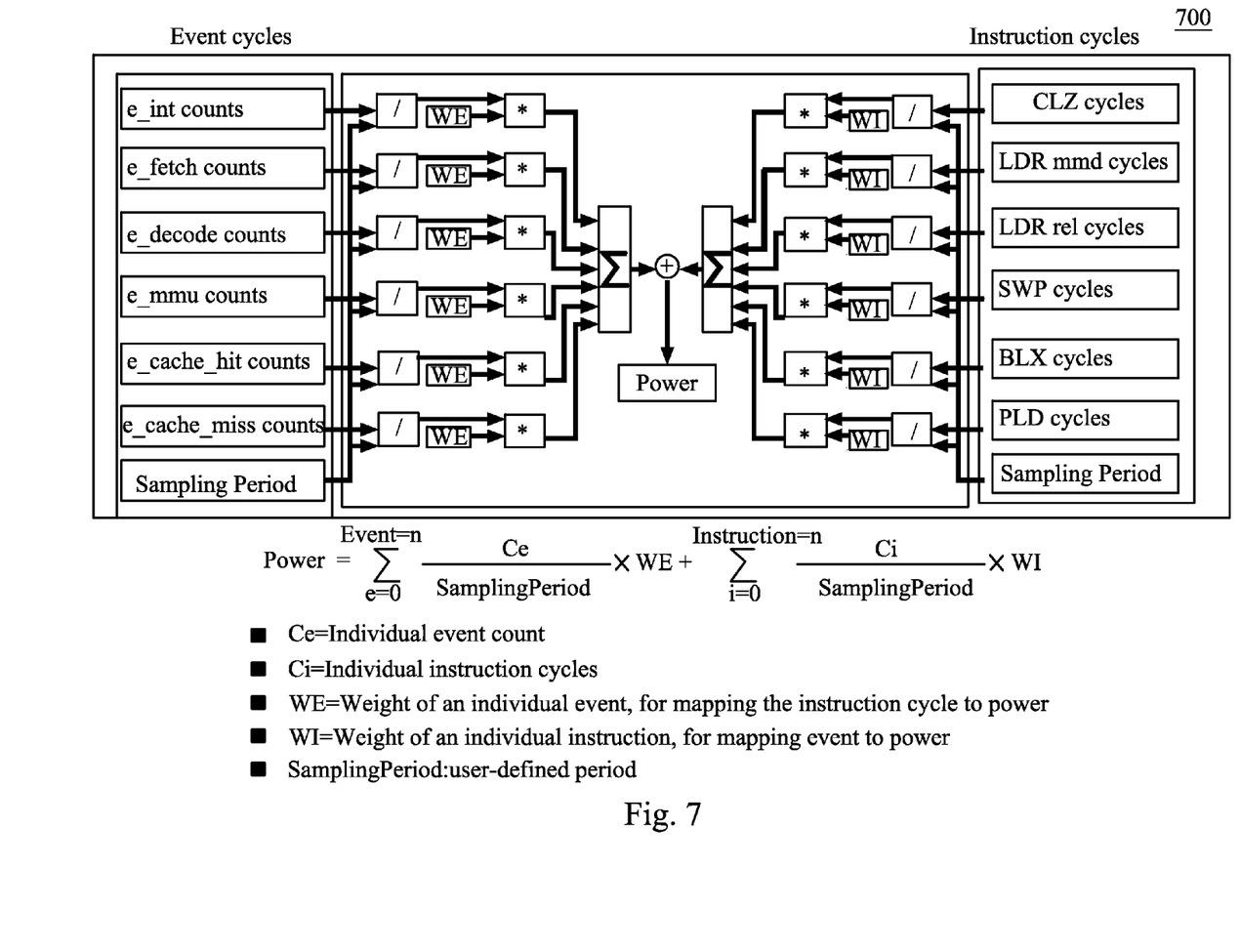
FIG. 7 is a block diagram of a flow chart of a method of estimating power consumption of a processor, in accordance with some embodiments.

FIG. 7 is a block diagram of a flow chart of a method 700 of estimating power consumption of a processor, in accordance with some embodiments. Method 700 is a set of instructions for execution by a processor and stored in a non-transitory, computer readable storage medium. In method 700, Event cycles and Instruction cycles are combined to estimate power consumption Power. Method 700 is usable to perform some or all of the operations of event monitor 620, micro-code analyzer 640, and estimate power consumption 660, as discussed above with respect to FIG. 6.

Figure 8:
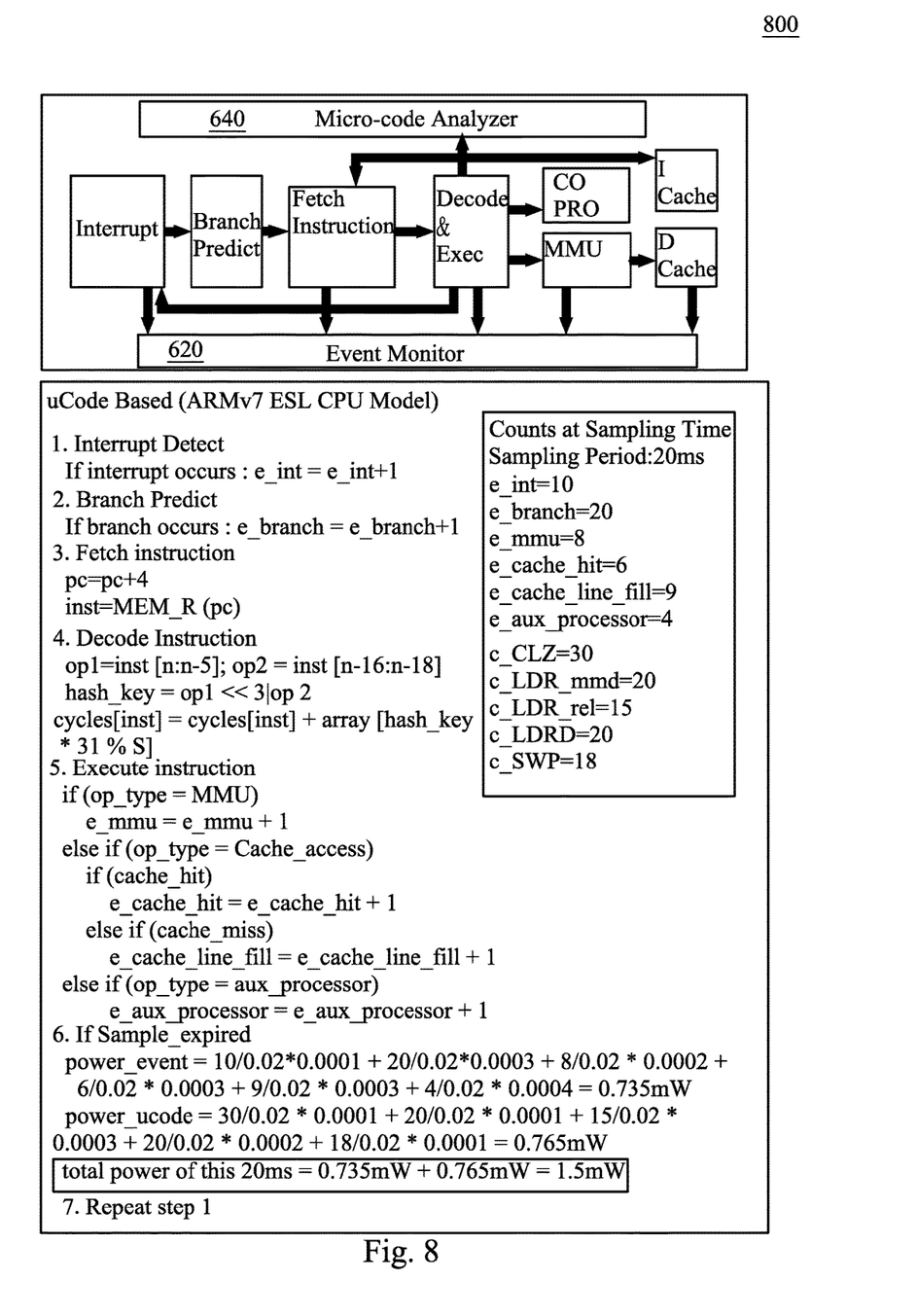
FIG. 8 is a block diagram of a flow chart and a set of instructions of a method of estimating power consumption of a processor, in accordance with some embodiments.

FIG. 8 is a block diagram of a flow chart and a set of instructions of a method 800 of estimating power consumption of a processor, in accordance with some embodiments. The set of instructions of method 800 are for execution by a processor and are stored in a non-transitory, computer readable storage medium. In method 800, event monitor 620 and micro-code monitor 640 are performed by uCode Based (ARMv7 ESL CPU Mode) to estimate a total power consumption. Method 800 is usable to perform some or all of the operations of event monitor 620, micro-code analyzer 640, and estimate power consumption 660, as discussed above with respect to FIG. 6.

Figure 9:
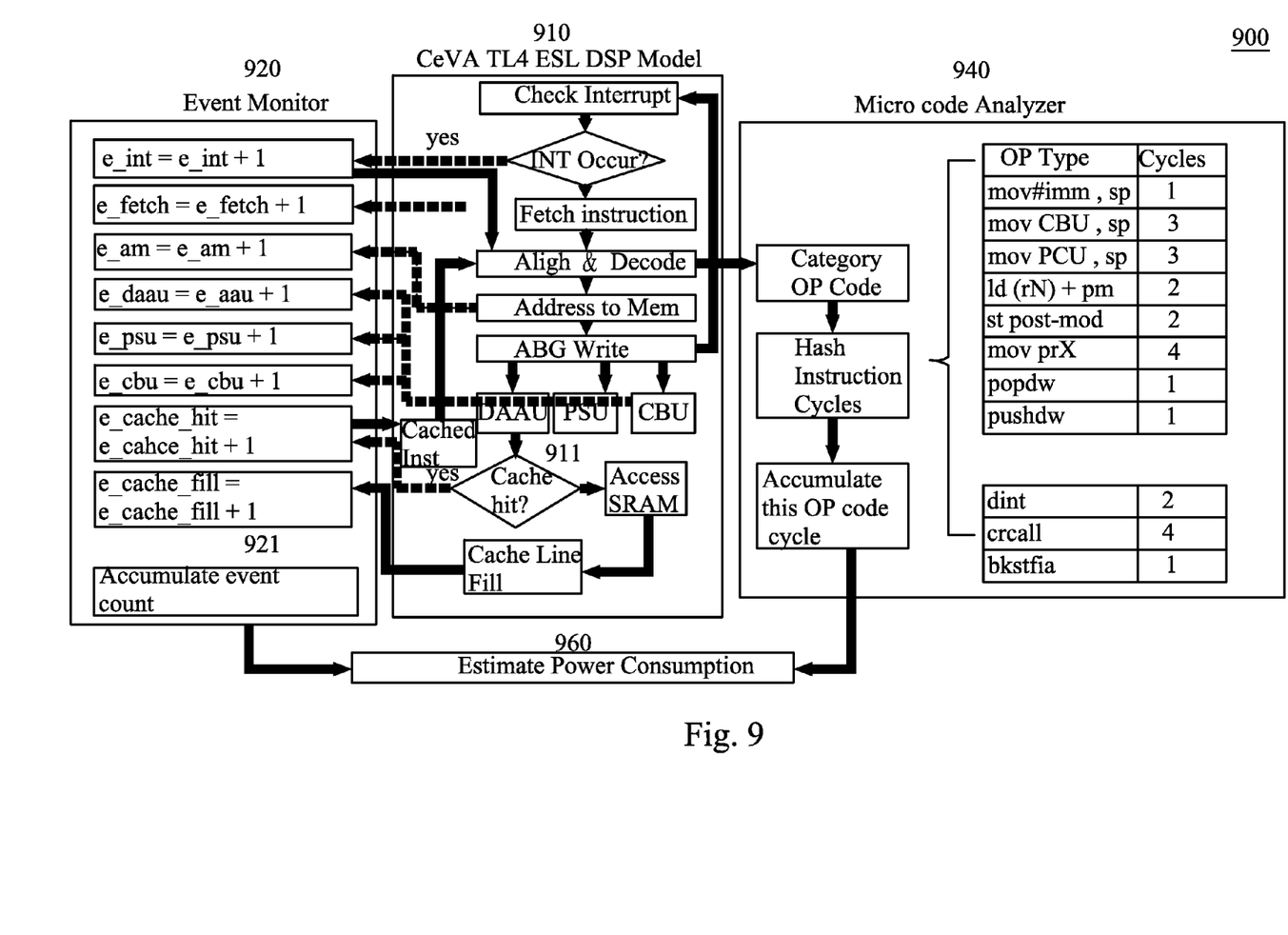
FIG. 9 is a block diagram of a flow chart of a method of estimating power consumption of a processor, in accordance with some embodiments.

FIG. 9 is a block diagram of a flow chart of a method 900 of estimating power consumption of a processor, in accordance with some embodiments. Method 900 is a set of instructions for execution by a processor and stored in a non-transitory, computer readable storage medium. A CeVA TL4 ESL DSP model 910 is accessed by an event monitor 920 and by a micro-code analyzer 940 to estimate power consumption 960.

CeVA TL4 ESL DSP model 910, event monitor 920, micro-code analyzer 940, and estimate power consumption 960 are usable as ESL processor models 110 and 210, event monitors 120 and 220, micro-code analyzers 140 and 340, and total power consumption 160, respectively, as discussed above with respect to FIGS. 1-3.

CeVA TL4 ESL DSP model 910 comprises blocks 911 that perform block-level activities in response to machine code instructions. Event monitor 920 traces the activities of individual blocks 911 in CeVA TL4 ESL DSP model 910 to identify specific events 921 associated with a particular set of machine code instructions. Accumulate event count performs a power calculation by events based on events 921 to generate a total event power consumption value.

Micro-code analyzer 940 analyzes the set of machine code instructions to extract an ordered list of micro-code instructions corresponding to CeVA TL4 ESL DSP model 910. Category OP Code derives the micro-code instructions by decoding the operation code portion or entirety of each machine code instruction in accordance with one or more functional blocks 911 of CeVA TL4 ESL DSP model 910. Hash Instruction Cycles analyzes the ordered list of micro-code instructions to determine a number of times each identified micro-code instruction OP Type is executed. Micro-code analyzer 940 thereby hashes out a number of Cycles for each OP Type from the ordered list of micro-code instructions associated with the machine code operations. Accumulate this OP code cycle performs a power calculation by micro-code based on the Cycles for each OP Type to generate a total cycle power consumption value.

Estimate power consumption 960 combines the total cycle power consumption value from Accumulate event count and the total cycle power consumption value from Accumulate this OP code cycle to estimate a total consumption power value for the set of machine code instructions executed on CeVA TL4 ESL DSP model 910.

Figure 4:
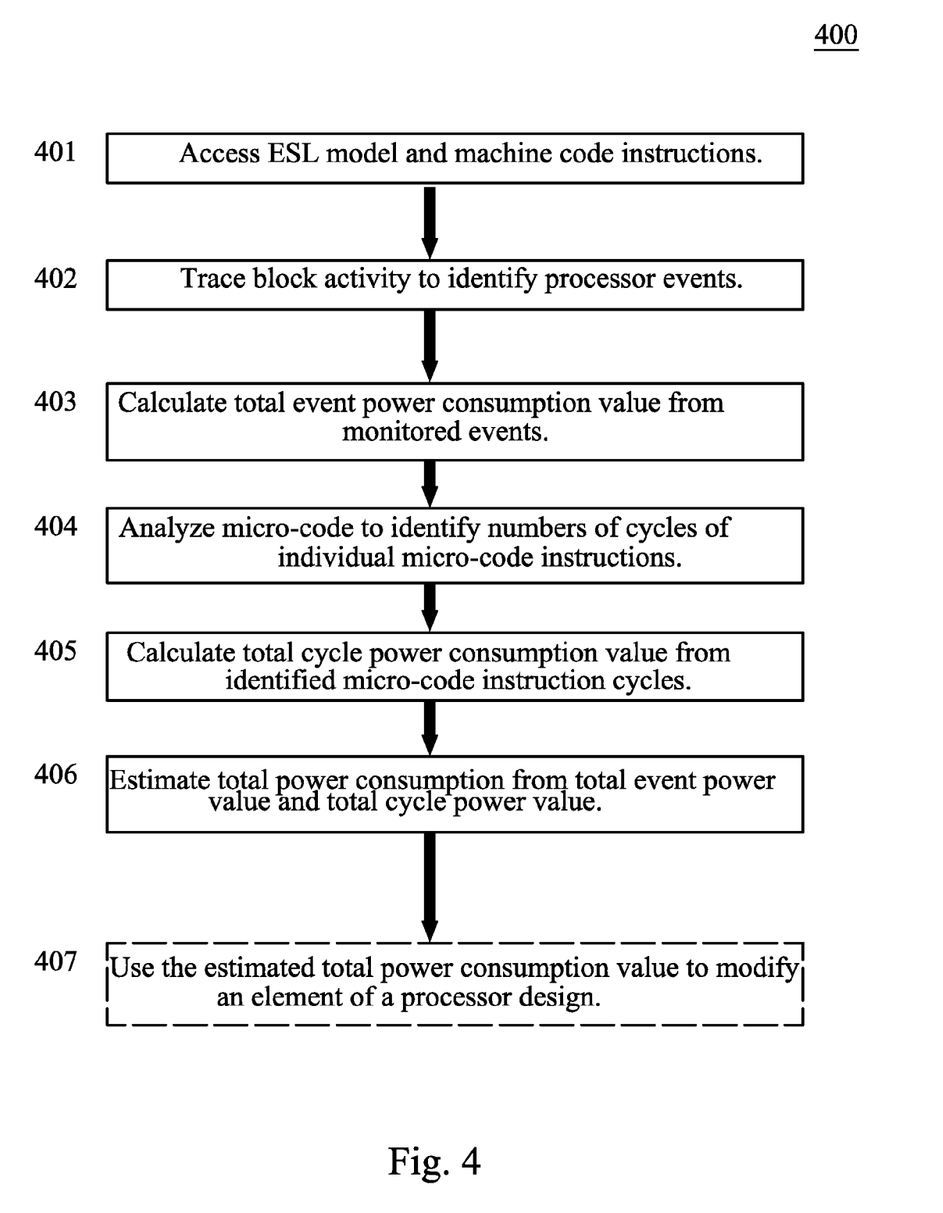
FIG. 4 is a flow chart of a method of estimating power consumption of a processor, in accordance with some embodiments.

FIG. 4 is a flow chart of a method 400 of estimating power consumption of a processor, in accordance with some embodiments. Method 400 is a set of instructions for execution by a processor and stored in a non-transitory, computer readable storage medium. In some embodiments, estimating power consumption of a processor in accordance with the operations of method 400 comprises accessing, creating, or modifying one or more electronic files containing data corresponding to an ESL processor model, event weights, instruction weights, sampling periods, and/or power estimations.

At operation 401, a processor of a system for estimating power consumption of a processor accesses, as a result of executing instructions corresponding to at least one of method 100, 200, 300, 600, 700, 800, or 900, an ESL processor model and set of machine code instructions. In some embodiments, the ESL processor model and/or set of machine code instructions are accessed from a file stored in a non-transitory, computer readable storage medium. In some embodiments, the ESL processor model and/or set of machine code instructions are received through an input/output (I/O) device. In some embodiments, an ESL processor model is ESL processor model 110 discussed above with respect to FIG. 1. In some embodiments, an ESL processor model is ESL model 210 discussed above with respect to FIGS. 2 and 3. In some embodiments, an ESL processor model is ARMv7 ESL CPU model 610 discussed above with respect to FIGS. 6-8. In some embodiments, an ESL processor model is CeVA TL4 ESL DSP model 910 discussed above with respect to FIG. 9. The set of machine code instructions is a set of instructions configured to be executed by a processor represented by the ESL model.

At operation 402, activities of functional blocks of the ESL model are traced based on the set of machine code instructions to determine block events associated with the machine code. In some embodiments, functional block activities are traced by event monitor 120 discussed above with respect to FIG. 1. In some embodiments, functional block activities are traced by event monitor 220 discussed above with respect to FIG. 2. In some embodiments, functional block activities are traced by event monitor 620 discussed above with respect to FIGS. 6-8. In some embodiments, functional block activities are traced by event monitor 920 discussed above with respect to FIG. 9.

At operation 403, a total event-based power consumption value is calculated based on the events identified at operation 402. In some embodiments, a total event-based power consumption value is calculated by power estimation 130 discussed above with respect to FIG. 1. In some embodiments, a total event-based power consumption value is calculated by power calculation by events 230 discussed above with respect to FIG. 2. In some embodiments, a total event-based power consumption value is calculated by sampling power 630 discussed above with respect to FIGS. 6-8. In some embodiments, a total event-based power consumption value is calculated by Accumulate event count, discussed above with respect to FIG. 9.

At operation 404, the set of machine code instructions is analyzed based on the ESL processor model to determine micro-code instruction activity. The analysis uses the operation code portion of each machine code instruction and the ESL processor model to determine the micro-code instructions required to execute the set of machine code instructions on the processor represented by the ESL processor model. The analysis identifies the numbers of cycles of each micro-code instruction type associated with the operation code. In some embodiments, micro-code instructions are analyzed by micro-code analyzer 140 discussed above with respect to FIG. 1. In some embodiments, micro-code instructions are analyzed by micro-code analyzer 340 discussed above with respect to FIG. 3. In some embodiments, micro-code instructions are analyzed by micro-code analyzer 640 discussed above with respect to FIGS. 6-8. In some embodiments, micro-code instructions are analyzed by micro-code analyzer 940 discussed above with respect to FIG. 9.

At operation 405, a total cycle-based power consumption value is calculated based on the micro-code instruction cycles identified at operation 404. In some embodiments, a total cycle-based power consumption value is calculated by power estimation 150 discussed above with respect to FIG. 1. In some embodiments, a total cycle-based power consumption value is calculated by power calculation by micro-code 350 discussed above with respect to FIG. 3. In some embodiments, a total cycle-based power consumption value is calculated by sampling power 650 discussed above with respect to FIGS. 6-8. In some embodiments, a total cycle-based power consumption value is calculated by Accumulate this OP code cycle, discussed above with respect to FIG. 9.

At operation 406, a total power consumption value is estimated based on the total event-based power consumption value and the total cycle-based power consumption value. In some embodiments, the total power consumption value is estimated by summing the total event-based power consumption value and the total cycle-based power consumption value. In some embodiments, a total power consumption value is estimated by total power consumption 160 discussed above with respect to FIG. 1. In some embodiments, a total power consumption value is estimated by estimate power consumption 660 discussed above with respect to FIGS. 6-8. In some embodiments, a total power consumption value is estimated by estimate power consumption 960 discussed above with respect to FIG. 9.

At operation 407, in some embodiments, the total power consumption value is used to modify an element of a processor design. In some embodiments, using the total power consumption value to modify an element of a processor design includes generating a file containing one or more of the set of machine code instructions, the total event-based power consumption value, the total cycle-based power consumption value, or the total power consumption value.

In some embodiments, using the total power consumption value to modify an element of a processor design includes correlating the total power consumption value with a power consumption value measured from a processor represented by the ESL processor model. In some embodiments, using the total power consumption value to modify an element of a processor design includes modifying a hardware element of a processor represented by the ESL processor model.

In some embodiments, using the total power consumption value to modify an element of a processor design includes modifying a file stored in a non-transitory, computer readable storage medium. In some embodiments, modifying a file stored in a non-transitory, computer readable storage medium includes modifying a file used to form a set of masks for manufacturing a processor represented by the ESL processor model.

Figure 5:
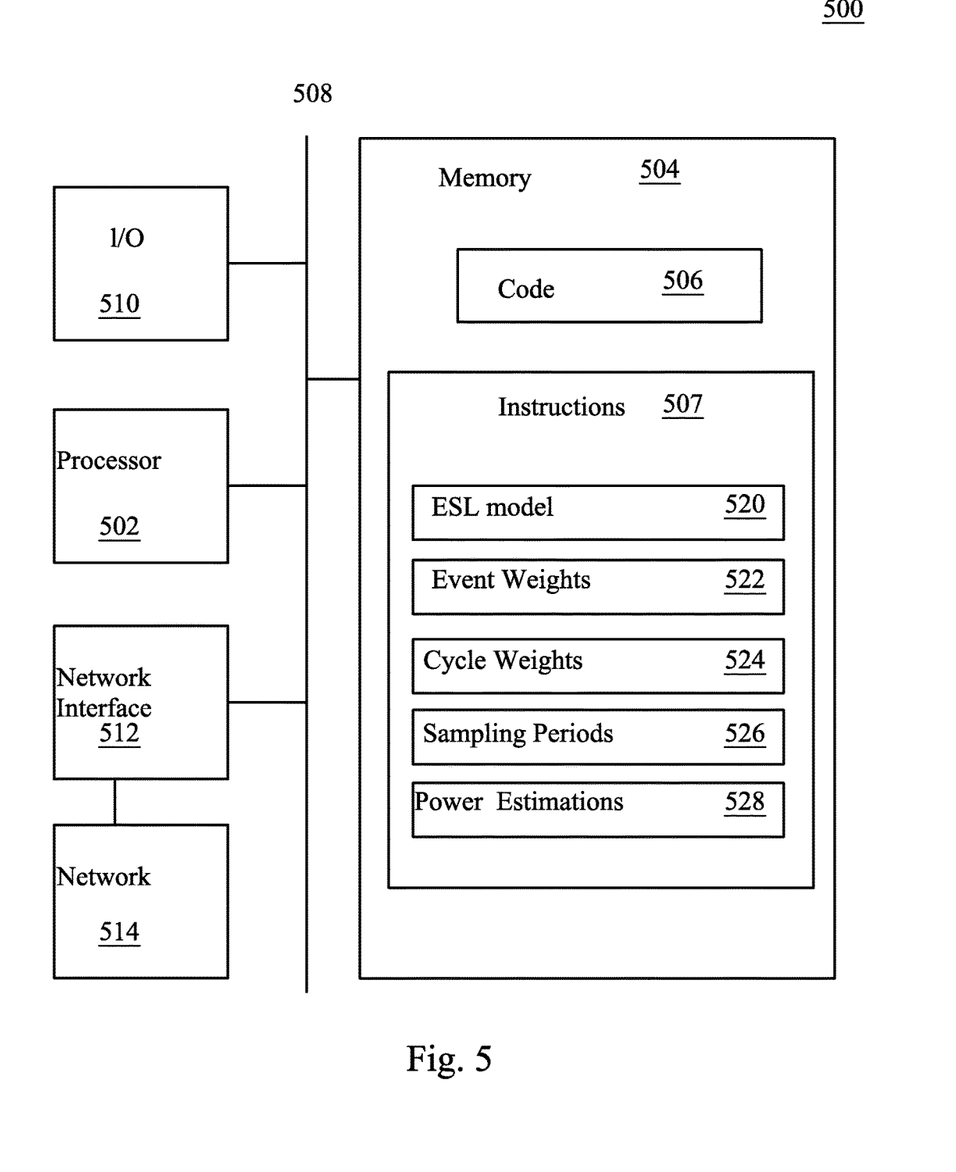
FIG. 5 is a schematic view of a system for estimating power consumption of a processor, in accordance with some embodiments.

FIG. 5 a schematic view of a system 500 for estimating power consumption of a processor, in accordance with some embodiments. System 500 includes a hardware processor 502 and a non-transitory, computer readable storage medium 504 encoded with, i.e., storing, the computer program instructions 506, i.e., a set of executable instructions. Instructions 506 include instructions for estimating power consumption of a processor. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program instructions 506 encoded in the computer readable storage medium 504 in order to cause system 500 to be usable for performing a portion or all of the operations as described in method 400.

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device) for storing instructions and/or data in a non-transitory manner. For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform method 400. In some embodiments, the storage medium 504 also stores information needed for performing method 400 as well as information generated during the performance of the method 400, such as an ESL processor model 520, event weight parameters 522, cycle weight parameters 524, a sampling period parameter 526, power estimations 528, and/or a set of executable instructions to perform the operation of method 400.

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and/or commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, method 400 is implemented in two or more systems 500, and information such as ESL processor model, event weights, cycle weights, sampling periods, and power estimations are exchanged between different systems 500 via network 514.

System 500 is configured to receive information related to processor power estimations. The information is transferred to processor 502 via bus 508 and is then stored in computer readable medium 504 as ESL processor model 520. In some embodiments, the ESL processor model is accessed in operation 401 (FIG. 4). System 500 is configured to receive information related to event weights which is stored in computer readable medium 504 as event weight parameters 522. In some embodiments, the event weight parameters are applied in operation 403. System 500 is configured to receive information related to cycle weights which is stored in computer readable medium 504 as cycle weight parameters 524. In some embodiments, the cycle weight parameters are applied in operation 405. System 500 is configured to receive information related to sampling periods which is stored in computer readable medium 504 as sampling period parameter 526. In some embodiments, a sampling period is applied in operation 403. In some embodiments, a sampling period is applied in operation 405. In some embodiments, a sampling period is applied in operation 406. System 500 is configured to generate information related to the power estimations which is stored in computer readable medium 504 as power estimations 528. In some embodiments, the power estimations are generated in operations 403, 405, and 406.

By being configured to execute method 400, system 500 is able to estimate power consumption of a processor with greater accuracy than with systems in which state-level considerations are applied, and without requiring calculation times associated with other systems in which a low-level processor cycle analysis is applied.

In some embodiments, a method of estimating power consumption of a processor comprises accessing an electronic system level (ESL) model of the processor, the ESL model comprising a plurality of functional blocks, identifying a plurality of processor events by tracing activity of the plurality of functional blocks for a plurality of machine code instructions, and calculating a first power consumption value based on the plurality of processor events. The method further comprises identifying a plurality of cycles by analyzing a plurality of micro-code operation codes corresponding to the plurality of machine code instructions, calculating a second power consumption value based on the plurality of cycles, and calculating a total power consumption value from the first power consumption value summed with the second power consumption value.

In some embodiments, a product comprises a non-transitory, computer readable storage medium containing a set of instructions, the set of instructions configured to cause a processor to access an electronic system level (ESL) model of a processing device, the ESL model comprising a plurality of functional blocks, analyze a plurality of micro-code operation codes corresponding to a plurality of machine code instructions, and calculate a cycle-based power consumption value based on a plurality of cycles identified in the analysis of the plurality of micro-code operation codes. The set of instructions is configured to cause the processor to trace activity of the plurality of functional blocks for the plurality of machine code instructions, and calculate an event-based power consumption value based on a plurality of processing device events identified from the traced activity, and estimate a total power consumption value by adding the cycle-based power consumption value to the event-based power consumption value.

In some embodiments, a system comprises a processor and a memory including computer program code for one or more programs, the memory and the computer program code configured to, with the processor, cause the system to access an electronic system level (ESL) model of a processing device, the ESL model comprising a plurality of functional blocks, trace activity of the plurality of functional blocks for a plurality of machine code instructions, and analyze a plurality of micro-code operation codes corresponding to the plurality of machine code instructions. The computer program code is configured to cause the system to calculate a first power consumption value by performing a summing operation on a plurality of processing device events identified from the traced activity, calculate a second power consumption value by performing a summing operation on a plurality of cycles identified in the analysis of the plurality of micro-code operation codes, and estimate a total power consumption value by adding the first power consumption value to the second power consumption value.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method of estimating power consumption of a processor, the method comprising:
   accessing an electronic system level (ESL) model of the processor, the ESL model comprising a plurality of functional blocks;
   identifying a plurality of processor events by tracing activity of the plurality of functional blocks for a plurality of machine code instructions;
   calculating a first power consumption value based on power consumption values for each processor event of the plurality of processor events;
   analyzing the plurality of machine code instructions to determine a plurality of micro-code instructions corresponding to executing the plurality of machine code instructions using the ESL model;
   identifying a number of execution cycles for each micro-code instruction of the plurality of micro-code instructions;
   calculating a second power consumption value based on power consumption values for the number of execution cycles for each micro-code instruction of the plurality of micro-code instructions, wherein calculating the second power consumption value comprises applying a weight to the number of execution cycles for each micro-code instruction of the plurality of micro-code instructions, each weight having a value that varies based on an instruction type of the corresponding micro-code instruction of the plurality of micro-code instructions; and
   calculating a total power consumption value from the first power consumption value summed with the second power consumption value.

2. The method of claim 1, wherein identifying the plurality of processor events comprises identifying an event type of each processor event of the plurality of processor events.

3. The method of claim 1, wherein calculating the first power consumption value comprises applying a weight to each processor event of the plurality of processor events.

4. The method of claim 3, wherein applying the weight to each processor event of the plurality of processor events comprises applying the weight having a value that varies based on an event type of each processor event of the plurality of processor events.

5. The method of claim 1, wherein calculating the first power consumption value comprises performing a summing operation on the plurality of processor events.

6. The method of claim 1, wherein analyzing the plurality of machine code instructions comprises identifying an operation type of each operation code of a plurality of operation codes corresponding to the plurality of machine code instructions.

7. The method of claim 1, wherein calculating the second power consumption value comprises performing a summing operation on the power consumption values for the number of execution cycles for each micro-code instruction of the plurality of micro-code instructions.

8. The method of claim 1, wherein at least one of calculating the first power consumption value, calculating the second power consumption value, or calculating the total power consumption value comprises performing a division based on a sampling period.

9. The method of claim 1, further comprising using the estimated total power consumption value to modify an element of a processor design.

10. The method of claim 1, wherein accessing the ESL model of the processor comprises accessing an ESL model of a central processing unit (CPU).

11. The method of claim 1, wherein accessing the ESL model of the processor comprises accessing an ESL model of a digital signal processor (DSP).

12. A product comprising:
a non-transitory, computer readable storage medium containing a set of instructions, the set of instructions configured to cause a processor to:
access an electronic system level (ESL) model of a processing device, the ESL model comprising a plurality of functional blocks;
analyze a plurality of machine code instructions to determine a plurality of micro-code instructions corresponding to executing the plurality of machine code instructions using the ESL model;
calculate a cycle-based power consumption value based on a number of execution cycles for each micro-code instruction of the plurality of micro-code instructions identified in the analysis of the plurality of machine code instructions;
trace activity of the plurality of functional blocks for the plurality of machine code instructions;
calculate an event-based power consumption value based on power consumption values for each processing device event of a plurality of processing device events identified from the traced activity, wherein calculating the event-based power consumption value comprises applying a weight to the power consumption value for each processing device event of the plurality of processing device events, the weight having a value that varies based on an event type of the corresponding processing device event of the plurality of processing device events; and
estimate a total power consumption value by adding the cycle-based power consumption value to the event-based power consumption value.

13. The product of claim 12, wherein the set of instructions is configured to cause the processor to calculate the event-based power consumption value by:

performing a summing operation on the power consumption values for each processing device event of the plurality of processing device events.

14. The product of claim 12, wherein the set of instructions is configured to cause the processor to calculate the cycle-based power consumption value by:
performing a summing operation on power consumption values for the number of execution cycles for each micro-code instruction of the plurality of micro-code instructions; and
applying a weight to the number of execution cycles for each micro-code instruction of the plurality of micro-code instructions.

15. The product of claim 14, wherein the set of instructions is configured to cause the processor to calculate the cycle-based power consumption value by applying the weight having a value that varies based on an instruction type of each micro-code instruction of the plurality of micro-code instructions.

16. The product of claim 12, wherein the set of instructions is configured to cause the processor to calculate at least one of the event-based power consumption value, the cycle-based power consumption value, or the total power consumption value by performing a division based on a sampling period.

17. The product of claim 12, wherein accessing the ESL model of the processing device comprises accessing an ESL model of a central processing unit (CPU) or a digital signal processor (DSP).

18. A system comprising:
a processor; and
a memory including computer program code for one or more programs,
the memory and the computer program code configured to, with the processor, cause the system to:
access an electronic system level (ESL) model of a processing device, the ESL model comprising a plurality of functional blocks;
trace activity of the plurality of functional blocks for a plurality of machine code instructions;
analyze the plurality of machine code instructions to determine a plurality of micro-code instructions corresponding to executing the plurality of machine code instructions using the ESL model;
calculate a first power consumption value by performing a summing operation on power consumption values for each processing device event of a plurality of processing device events identified from the traced activity;
calculate a second power consumption value by performing a summing operation on a number of execution cycles for each micro-code instruction of the plurality of micro-code instructions identified in the analysis of the plurality of machine code instructions, wherein the summing operation is performed by applying a weight to the number of execution cycles for each micro-code instruction of the plurality of micro-code instructions, each weight having a value that varies based on an instruction type of the corresponding micro-code instruction of the plurality of micro-code instructions; and
estimate a total power consumption value by adding the first power consumption value to the second power consumption value.

19. The system of claim 18, wherein the memory and the computer program code are configured to, with the at least one processor, cause the system to perform the summing operation on the power consumption values for each processing device event of the plurality of processing device events by applying a weight to the power consumption value for each processing device event, the weight having a value that varies based on an event type of each processing device event of the plurality of processing device events.

20. The system of claim 18, wherein accessing the ESL model of the processing device comprises accessing an ESL model of a central processing unit (CPU) or a digital signal processor (DSP).

\* \* \* \* \*